Aug. 22, 1939.  C. R. KINES  2,170,383
AIRCRAFT RECORDING MEANS
Filed March 23, 1937   2 Sheets-Sheet 1

INVENTOR.
Charles R. Kines
BY
J. Wesley Everett
ATTORNEYS.

Aug. 22, 1939.     C. R. KINES     2,170,383
AIRCRAFT RECORDING MEANS
Filed March 23, 1937     2 Sheets-Sheet 2

INVENTOR.
Charles R. Kines
BY
J. Wesley Everett
ATTORNEYS.

Patented Aug. 22, 1939

2,170,383

UNITED STATES PATENT OFFICE 2,170,383

AIRCRAFT RECORDING MEANS

Charles R. Kines, Baltimore, Md.

Application March 23, 1937, Serial No. 132,631

1 Claim. (Cl. 179—100.11)

The present invention relates to equipment for aircraft and has particular reference to means for recording radio messages and other information given by the pilot while the ship is in flight.

As is well known, one of the most difficult problems in aviation after a mishap is determining whether or not the pilot called for weather reports and other necessary data that probably would have prevented the catastrophe. On regular passenger and mail routes, regulations call for reports on flying conditions while the flight is in progress. This is done by radio and if the radio is out of commission there is no way in which to check that such reports were actually made.

One object of this invention is to provide an aircraft with a fireproof and shockproof compartment in which a recording means may be safely transported with maximum security against fire and other hazards.

Another object is to provide means associated with the radio equipment whereby all messages sent out and received by the ship are permanently recorded.

Still another object is to provide means whereby the pilot may record certain data when the radio becomes disabled, so in case of an accident, or serious injury to the pilot, the nature and cause of the mishap may be more easily ascertained.

With the above and other novel objects in view as will be hereinafter apparent the several novel features of the invention in its preferred form will be more fully described in the accompanying drawings in which.

Figure 3:
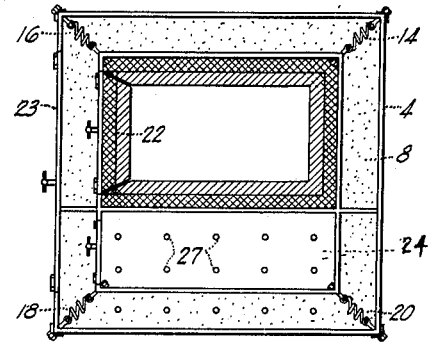
Fig. 3 is a detailed enlarged sectional view of the compartment 4 having the recording apparatus removed, taken substantially along the same line in Fig. 1 as Fig. 2.
Figure 4:
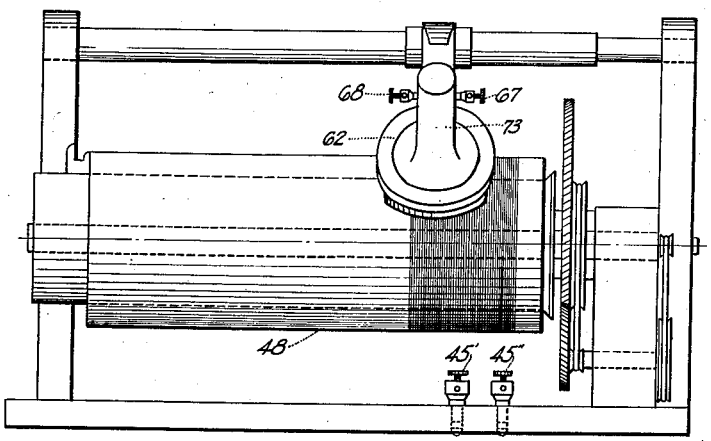
Fig. 4 is a side view of a cylinder type recording instrument.
Figure 5:
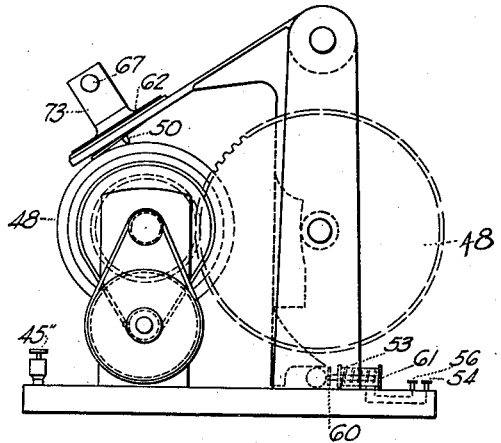
Fig. 5 is an end view of the recording instrument shown in Fig. 4.

The invention therefore consists of a compartment 4 built within the aircraft and located preferably in the tail section. This location is the most desirous because it affords the best protection in case of fire or crashes and other mishaps to the ship. The compartment 4 is provided with a lining 8 of rock wool, or other fire proof insulation to prevent the recording instrument from excessive heat and mishap in case of fire and mishap. Within the fireproof casing 8 is an inner casing 10 made of a shock proof material, such as sponge rubber. Placed within the container 10 is the recording apparatus 6 suitably mounted upon a platform 12. The shock proof compartment 10 is preferably mounted upon resilient members such as springs 14, 16, 18, and 20. The compartment is provided with a convenient door 22 (as shown in Fig. 3), for affording access to the recording instrument. The compartment 4 has preferably a second compartment 24 for housing a storage battery 26 used in operating the recording instrument. The walls of this compartment are provided with small perforations 27 for admitting air to the battery and emitting gases emanating therefrom.

Figure 1:
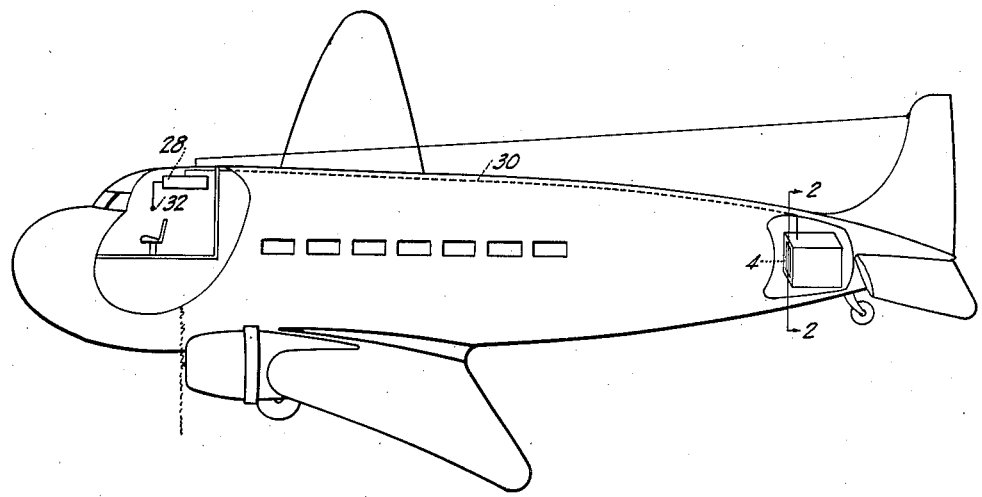
Fig. 1 is a side view of an airplane having parts broken away showing the approximate location of the recording apparatus.
Figure 2:
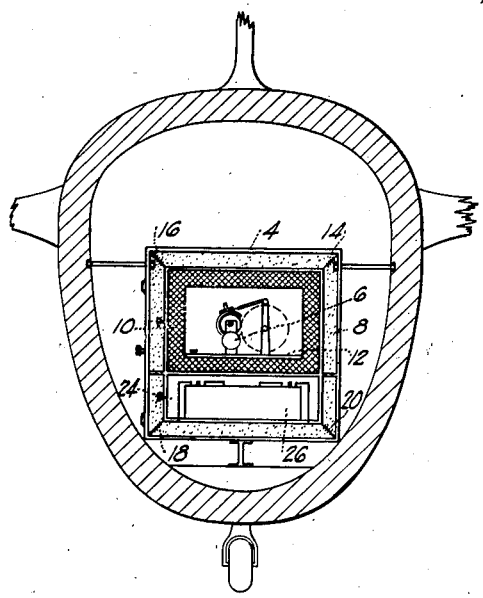
Fig. 2 is a cross sectional view of the plane taken along the line 2—2 of Fig. 1, showing the location of a recording device within the compartment 4, the front of said housing being removed.

The recording apparatus is connected with the radio 28 by suitable wires running within the cable 30 (Fig. 1). When the operator speaks into the radio microphone 32, the message is recorded by the instrument upon the roll 48 by the recording device. Also when a message is received by the operator it is also recorded. The primary purpose of this type of installation is to have a check on all messages transmitted and received from and to the aircraft.

Figure 6:
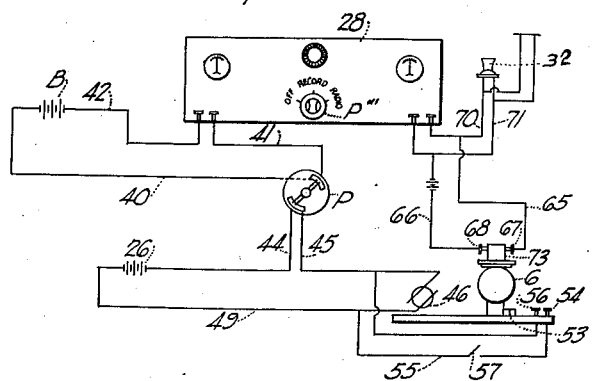
Fig. 6 is a view of a wiring diagram.

Referring more particularly to Fig. 6, the radio 28 is of the regular commercial type used in aircraft. A battery B is used to supply the current for its operation, having a switch $p$ to form contact for completing the circuit thereto. The switch $p$ is designed to close an electric circuit to operate the recording apparatus at the same time the circuit is closed to operate the radio. The switch $p$ can also be operated to close the circuit to the recording apparatus when the operating radio circuit is left open.

Figure 7:
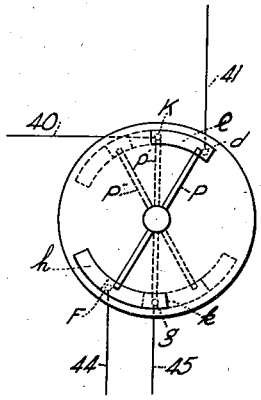
Fig. 7 is a plan view of the switch $p$ having the operating knob $p''$ removed, showing the several locations of the switch in full and dotted lines.

To operate the radio and recording apparatus as set forth hereinbefore, the switch $p$ (Fig. 7) is turned to contact the terminal $d$, as shown by the solid lines in Fig. 7. The switch is now closed to complete the circuit to operate the radio. The current will flow from battery B through wire 40 to contact K which is conducted to terminal $d$ by a conductor plate $e$ carried by the switch $p$ and through the wire 41 to the radio. The other side of the circuit will flow through the wire 42 to the battery B. When the switch is in this position the plate $h$ on the lower portion thereof will contact the members $f$ and $g$, closing the circuit to the recorder operating means. The current from battery 26 will flow through the wire 44 to switch $p$ and wire 45 which is connected to the terminal 45' to one side of the recorder operating motor 46 for operating the recording apparatus and the other terminal 45" is connected to the opposite side of the battery 26 by the wire 49, which will complete the circuit to the motor 46 and cause the mechanism to rotate the recording cylinder 48. By closing the electric circuit to the motor 46 an electric circuit to raise and lower the recording needle 50 upon the cylinder 48 is also closed. Connected with the wire 45 is a wire 52 leading to a terminal 56 which is connected with a solenoid 53. Connected with the wire 49 is a wire 55 leading to the opposite side of the solenoid 53 and connected thereto by a terminal 54. A conventional time switch 57 is inserted in the circuit to allow the cylinder 48 to pick up momentum before the recording needle 50 is brought in contact therewith. When the time switch closes the circuit to the solenoid 53 it becomes energized and the plunger 60 held outwardly by the spring 61 is withdrawn, permitting the diaphragm 62 to move toward the cylinder 48 within the proper distance for the recording device 50 to make contact with the cylinder.

Connected with the wires 70 and 71 leading to the microphone and earphones are wires 65 and 66, which are in turn connected to a solenoid 73 by way of the terminals 67 and 68. Connected with the solenoid 73 is a diaphragm 62 upon which the needle 50 is secured for making impressions in the cylinder.

When it is desirable only to operate the recording apparatus, the switch $p$ is turned as shown at $p'$, the plate $e$ will move out of contact with the terminal $d$ and break the electric circuit to the radio, while the plate $h$ is still in contact with the terminals $f$ and $g$. Located within the circuit leading from the transmitter to the recording instrument is an electric supplying unit 59 for operating the recording instrument directly from the transmitter and the pilot may record his message without transmitting it over the radio.

It is to be understood that the recording instrument set out and described herein may be substituted by another type, for instance, a tape recorder may be more desirable under certain circumstances than a cylinder or disk type.

In operation when a message is to be sent or received by radio the switch knob $p''$ is turned to the point marked "radio". The electric circuits to the radio and recorder will be closed and the recorder will be in operation to record all messages sent and received. When the switch knob $p''$ is turned to the position marked "record" the messages from the transmitter will be transmitted only to the recording device. To disconnect both the radio and recording instrument the switch knob $p''$ is turned to "off" position.

While I have shown and described a preferred form of my invention it will be understood that I have done so for clarification and that my invention is best defined in the following claim.

I claim:

In an airplane communicating device comprising, a recording apparatus including an electrically operated recording device, a radio having transmitting and receiving means for sending and receiving messages and an electric circuit for operating said radio, a shock and fireproof container for housing said recording apparatus, a separate electric circuit for operating said recording apparatus, an electric circuit connecting the said transmitting and receiving means with the said recording device and means for supplying electric energy to said circuit, a multiple switch having means when in one position for closing the said electric circuits to the radio and recording apparatus for operating the same, said switch having a second position closing only the electric circuit to the recording for recording only the messages passing through the transmitting means and a single operating means for positioning the said switch in the several positions.

CHARLES R. KINES.

CERTIFICATE OF CORRECTION.

Patent No. 2,170,383.

August 22, 1939.

CHARLES R. KINES.

It is hereby certified that error appears in the printed specification of the above numbered patent requiring correction as follows: Page 2, second column, line 43, in the claim, after the word "recording" first occurrence, insert apparatus; and that the said Letters Patent should be read with this correction therein that the same may conform to the record of the case in the Patent Office.

Signed and sealed this 21st day of November, A. D. 1939.

(Seal)

Henry Van Arsdale,
Acting Commissioner of Patents.